(12) United States Patent
Haller

(10) Patent No.: US 10,832,846 B2
(45) Date of Patent: Nov. 10, 2020

(54) LOW POWER SOLENOID WITH DROPOUT DETECTION AND AUTO RE-ENERGIZATION

(71) Applicant: Automatic Switch Company, Florham Park, NJ (US)

(72) Inventor: John J. Haller, Boonton, NJ (US)

(73) Assignee: Automatic Switch Company, Florham Park, NJ (US)

(*) Notice: Subject to any disclaimer, the term of this patent is extended or adjusted under 35 U.S.C. 154(b) by 284 days.

(21) Appl. No.: 16/103,602

(22) Filed: Aug. 14, 2018

(65) Prior Publication Data
US 2020/0058428 A1 Feb. 20, 2020

(51) Int. Cl.
*H01F 7/18* (2006.01)
*H01H 47/04* (2006.01)
*H02M 3/155* (2006.01)

(52) U.S. Cl.
CPC ......... *H01F 7/1816* (2013.01); *H01H 47/043* (2013.01); *H02M 3/155* (2013.01)

(58) Field of Classification Search
CPC ............. H01H 47/043; H02M 3/155; H02M 2003/1555; H01F 7/1816; H01F 2007/1822
See application file for complete search history.

(56) References Cited

U.S. PATENT DOCUMENTS 3,852,732 A * 12/1974 Yorksie ............ G01R 19/16542
320/136
4,454,558 A 6/1984 Huddart
4,757,418 A 7/1988 Bruckner
4,970,622 A 11/1990 Buchl
5,008,773 A 4/1991 Yoshida et al.
(Continued)

FOREIGN PATENT DOCUMENTS

JP 2000111122 A 4/2000
WO WO9740508 A1 10/1997
WO WO2016153972 A1 9/2016

OTHER PUBLICATIONS

Fowler, et al, "The Russian-American High Magnetic Field Collaboration", Pulsed Power Conference (1995), Digest of Technical Papers, 10th IEEE International vol. 1 , accessed: Dec. 2018.
(Continued)

*Primary Examiner* — Alfonso Perez Borroto
*Assistant Examiner* — Esayas G Yeshaw
(74) *Attorney, Agent, or Firm* — Mackey Law Firm PLLC (57) ABSTRACT

A solenoid control circuit can make measurements during operation to determine the state of a solenoid and can provide for rapid re-energization of a solenoid upon detection of a dropout condition. A method of controlling a solenoid can include closing an input switch, cycling a low side switch based on voltage drop across a resistor, opening the input switch after a time interval, closing the low side switch and driving a discharge switch to control the discharge current rate from an energy storage device to an inductor. The method can include determining a condition of the inductor based on a time interval between actuation of comparators and maintaining a level of energy in the energy storage device sufficient to cause the inductor to produce a magnetic field for actuating a valve.

22 Claims, 9 Drawing Sheets

(56) References Cited

U.S. PATENT DOCUMENTS

| | | | |
|---|---|---|---|
| 5,337,205 A | 8/1994 | Haun et al. | |
| 5,402,303 A | 3/1995 | Luck et al. | |
| 5,717,562 A | 2/1998 | Antone et al. | |
| 5,815,365 A | 9/1998 | Stege | |
| 5,940,262 A | 8/1999 | Archer | |
| 6,208,497 B1 | 3/2001 | Seale et al. | |
| 6,900,973 B2 | 5/2005 | Tojo et al. | |
| 7,612,977 B2 | 11/2009 | Protze | |
| 7,911,758 B2 * | 3/2011 | Haller | H02M 3/155 361/189 |
| 9,300,125 B2 | 3/2016 | Naiva et al. | |
| 2007/0188967 A1 | 8/2007 | Smith et al. | |
| 2007/0194751 A1 * | 8/2007 | Odaohhara | H02J 7/0031 320/112 |
| 2009/0309054 A1 | 12/2009 | Haller et al. | |
| 2012/0274235 A1 * | 11/2012 | Lee | H02M 3/156 315/297 |
| 2015/0115622 A1 | 4/2015 | Burdenko et al. | |
| 2017/0256974 A1 | 9/2017 | Baker | |
| 2019/0146569 A1 * | 5/2019 | Nge | G06F 1/329 713/320 |
| 2019/0334363 A1 * | 10/2019 | Snyder | H02M 1/32 |

OTHER PUBLICATIONS

Job, et al.; "Fast Field-Cycling Nuclear Magnetic Resonance Spectrometer", Scientific Instruments (1996), accessed: Dec. 2018.

Tilburgs; "Design and Realization of a Solenoid for a Robocup Kicking Device", Technische Universiteit Eindhoven (2006); accessed: Dec. 2018.

* cited by examiner

LOW POWER SOLENOID WITH DROPOUT DETECTION AND AUTO RE-ENERGIZATION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention The inventions disclosed and taught herein relate generally to control systems; and more specifically relate to low power control systems.

DESCRIPTION OF THE RELATED ART

U.S. Pat. No. 5,532,526 teaches "[a] control circuit for supplying a load with current having a high-amplitude portion with a rapid leading edge, and a lower-amplitude portion. The circuit is input-connected to a low-voltage supply source, and comprises a number of actuator circuits parallel-connected between the input terminals and each including a capacitor and a load. Each actuator circuit also comprises a first controlled switch between the respective load and a reference line, for enabling energy supply and storage by the respective load. A second controlled switch is provided between the capacitor line and the load line, for rapidly discharging the capacitors into the load selected by the first switch and recirculating the load current, or for charging the capacitors with the recirculated load current."

U.S. Pat. No. 6,646,851 teaches "[a] circuit arrangement for operating a solenoid actuator, for example, an electric motor provided in the form of a switched reluctance motor, permits operation of the motor in the event of malfunction or failure of part of an energy supply. The circuit arrangement advantageously includes an auxiliary battery serving as a redundance in addition to a main battery. The auxiliary battery is smaller and has a lower nominal voltage than the main battery. In order to permit continued operation of the electric motor in the event of failure, with a nominal operating voltage which is adapted to the nominal voltage of the main battery, a capacitor which can be switched on and off is connected in series to the batteries. An energy quantity can be accumulated in the capacitor by switching the current switching through an exciter winding of the electric motor in the manner of a switching regulator, whereby the nominal voltage of the capacitor finally exceeds the voltage in the auxiliary battery. When a sufficient quantity of energy has been accumulated, the electric motor can be actuated for a short time by means of the energy accumulated in the capacitor. Electrically actuated braking systems in commercial vehicles represent a significant and preferred area of application for the invention."

U.S. Pat. No. 7,911,758 teaches "[a] low power solenoid control circuit including a power source in series with a sensing element and a first diode, an inductor to actuate a valve, an energy storage device to store and discharge energy into the inductor, diodes to control current flow, and switches and a controller to control the circuit. The circuit may be operated by closing a first switch, thereby allowing a source current to flow through an inductor; opening the first switch, thereby forcing a charge current to flow through an energy storage device utilizing the inductance of the inductor; repeating these steps until the energy storage device is sufficiently charged; and upon command, closing a second switch, thereby forcing a discharge current to flow from the energy storage device to the inductor causing the inductor to produce an actuating magnetic field thereby actuating a mechanical valve."

Conventional solenoids can be designed to operate at a power level which will be sufficient to always operate within its parameters of design. If a mechanical shock, for instance, breaks the magnetic attraction, such a solenoid will merely provide the magnetic force to reinstate its prior state. Since the energy required to attract the armature at a distance is much larger than needed when the parts are near, this type of design uses much more energy than needed to retain the closed state. This consideration has spawned various types of solenoids that apply higher initial power and then reduce that power after the device has reached its final state. Some designs simply apply substantial amounts of power for a short time and then throttle the power back, while some use the lower power condition to charge an energy storage device such as a capacitor (see, e.g., U.S. Pat. No. 7,911,758 mentioned above). One issue with both types of devices is that the increased energy only occurs on initial powerup of the device, and any change in state of the device after that time is not detected or acted upon. Thus, if the solenoid was to experience a mechanical shock or other event that caused disengagement, the device would stay in that state without any supervisory notification.

The inventions disclosed and taught herein are directed to improved systems and methods for controlling a solenoid in low power applications.

BRIEF SUMMARY OF THE INVENTION

A solenoid control circuit can include circuitry for detecting a position of a solenoid operator and for re-energization of the solenoid following disengagement of the solenoid armature and fixed pole piece to which it is magnetically attracted, such as due to mechanical shock or vibration. A solenoid control circuit can include circuitry for making measurements during operation to determine one or more states of the magnetic components. A solenoid control circuit can include circuitry for rapid re-energization of a solenoid after de-energization. A solenoid control circuit can include circuitry for maintaining an energy storage device in a state of full charge after initial energization. A solenoid control circuit can include circuitry for determining the state of the charge of an energy storage device, which can include measuring the off time of a controller, such as a hysteretic controller, for controlling solenoid coil current.

A solenoid control circuit, such as a low power solenoid control circuit, can include a power source such as a source of direct current power, one or more switches, such as an input switch, a low side switch and a discharge switch, one or more diodes, such as blocking diodes, one or more solenoids, which can include moveable and fixed portions, one or more energy storage devices, such as capacitors, and one or more resistors, such as current sense or other resistors. A circuit can include one or more controllers for controlling one or more other components of the circuit, such as one or more switches or gates, and one or more components for communicating with a controller and/or other components of a circuitry system, which is can include one or more comparators for comparing two or more values or variables, such as analog, digital or other comparators. A controller can receive input from one or more other components of the circuit and can output signals to one or more other components of the circuit. One or more comparators can be arranged or otherwise configured to measure voltage drop across one or more components, such as one or more resistors, and to compare voltage drop to one or more threshold or other values, which can include one or more high or maximum values and/or one or more low or minimum values, separately or in combination, in whole or in part. A circuit can be wholly or partially incorporated into a solenoid, valve or component thereof, such as a solenoid valve for use in connection with pneumatic and/or hydraulic control systems.

A method of controlling a solenoid can include closing an input switch, energizing a low side switch and allowing a source current to flow through an inductor and a resistor, opening the low side switch, such as upon a voltage drop across the resistor reaching a value, such as a first, second or other threshold, and forcing or otherwise influencing a charge current to flow through an energy storage device, which can include utilizing the inductance of the inductor. A method can include closing the low side switch upon or in response to the voltage drop across the resistor reaching a second or other threshold, which can be or include a threshold smaller, less than or lower than a first threshold. A method can include repeating a series of charging steps until one or more energy storage devices is charged to an extent, which can be partially or fully. A method can include closing a discharge switch, forcing or otherwise directing a discharge current to flow from an energy storage device to an inductor, causing the inductor to produce an actuating magnetic field, and actuating a valve.

A method can include flowing a source current through an inductor that is less than the actuating or operating current of the inductor. A method can include flowing a source current through an inductor that is insufficient to cause the inductor to actuate a valve coupled to the inductor. A method can include measuring the voltage drop across one or more resistors with one or more comparators, which can include first and second comparators. A method can include measuring a time interval between the switching on and/or off of one or more comparators, such as a period of time between a second comparator switching off and a first comparator switching on. A method can include opening an input switch upon a time interval reaching a value, such as a cutoff value or other target value. A method can include measuring a plurality of time intervals over a series or plurality of occurrences of one comparator switching off and another comparator switching on, and opening an input switch upon a sum of one or more time intervals reaching a cutoff or other value, which can include a value that corresponds to a charge time of one or more energy storage devices.

A method can include opening one or more input switches, closing one or more low side switches and driving one or more discharge switches in a controlled manner. A method can include driving one or more switches via pulse width modulation (PWM) for one or more pulses and controlling a discharge current rate and an inductor's production of a magnetic field, which can be or include an actuating or other magnetic field. A method can include opening the low side switch and the discharge switch and returning or otherwise directing residual energy from the inductor to the energy storage device. A method can include closing the input switch and increasing one or more thresholds, such as a second threshold, which can include maintaining a threshold lower or higher than one or more other thresholds.

A method can include measuring a current discharge time interval, upon the time interval reaching a cutoff value, opening the input switch and pulsing the discharge switch, and causing an increase in current in the inductor. A method can further include opening the discharge switch. A method can include measuring a time interval between actuation of the second comparator and actuation of the first comparator and determining a condition of the inductor by comparing the time interval to a threshold value, which can include a value that represents a dropout condition of the inductor. A method can include compensating for the resistance of the inductor by adjusting a threshold value, such as based on an ambient temperature of a winding or coil of the inductor. A method can include maintaining one or more thresholds or values at a level sufficient to maintain a holding current of an inductor.

A method can include pulsing a discharge switch and maintaining a level of energy in an energy storage device sufficient to cause the inductor to produce an actuating magnetic field. A method can include maintaining a level of energy in an energy storage device sufficient to cause an inductor to produce an actuating magnetic field within 100 milliseconds or another period of time of a dropout condition of the inductor being detected. A method can include driving a discharge switch, such as by way of pulse width modulation, for a number of pulses adequate to maintain a level of energy in an energy storage device sufficient to cause an inductor coupled to the energy storage device to produce an actuating magnetic field upon or following a dropout condition of the inductor being detected. A method can include closing a discharge switch for a time period adequate to allow measurement of inductance without reducing the level of energy in an energy storage device below a level sufficient to cause an associated inductor to produce an actuating magnetic field.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having the benefits of this disclosure. It must be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Particular embodiments of the present disclosure may be described with reference to block diagrams and/or operational illustrations of methods. It will be understood that each block of the block diagrams and/or operational illustrations, and combinations of blocks in the block diagrams and/or operational illustrations, can be implemented by analog and/or digital hardware and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In at least some implementations, the functions/actions/structures noted in the figures may occur out of the order noted in the block diagrams and/or operational illustrations. For example, two operations shown as occurring in succession may be executed substantially concurrently or the operations may be executed in the reverse order, depending upon the functionality/acts/structure involved. Computer programs for use with or by one or more of the embodiments disclosed herein may be written in an object-oriented programming language, conventional procedural programming language, or lower-level code, such as assembly language and/or microcode. Such a program(s) may be executed entirely on a single processor and/or across multiple processors, as a stand-alone software package or as part of another software package.

Applicant has created systems and methods for detecting a position of a solenoid and for rapidly re-energizing the solenoid following de-energization. A low power solenoid driving circuit can ascertain a condition of a solenoid and can be insensitive to variations in operating voltage. A low power solenoid driving circuit can maintain an energy storage device in a state of full charge or other charge sufficient to operate a solenoid following initial energization.

Figure 1:
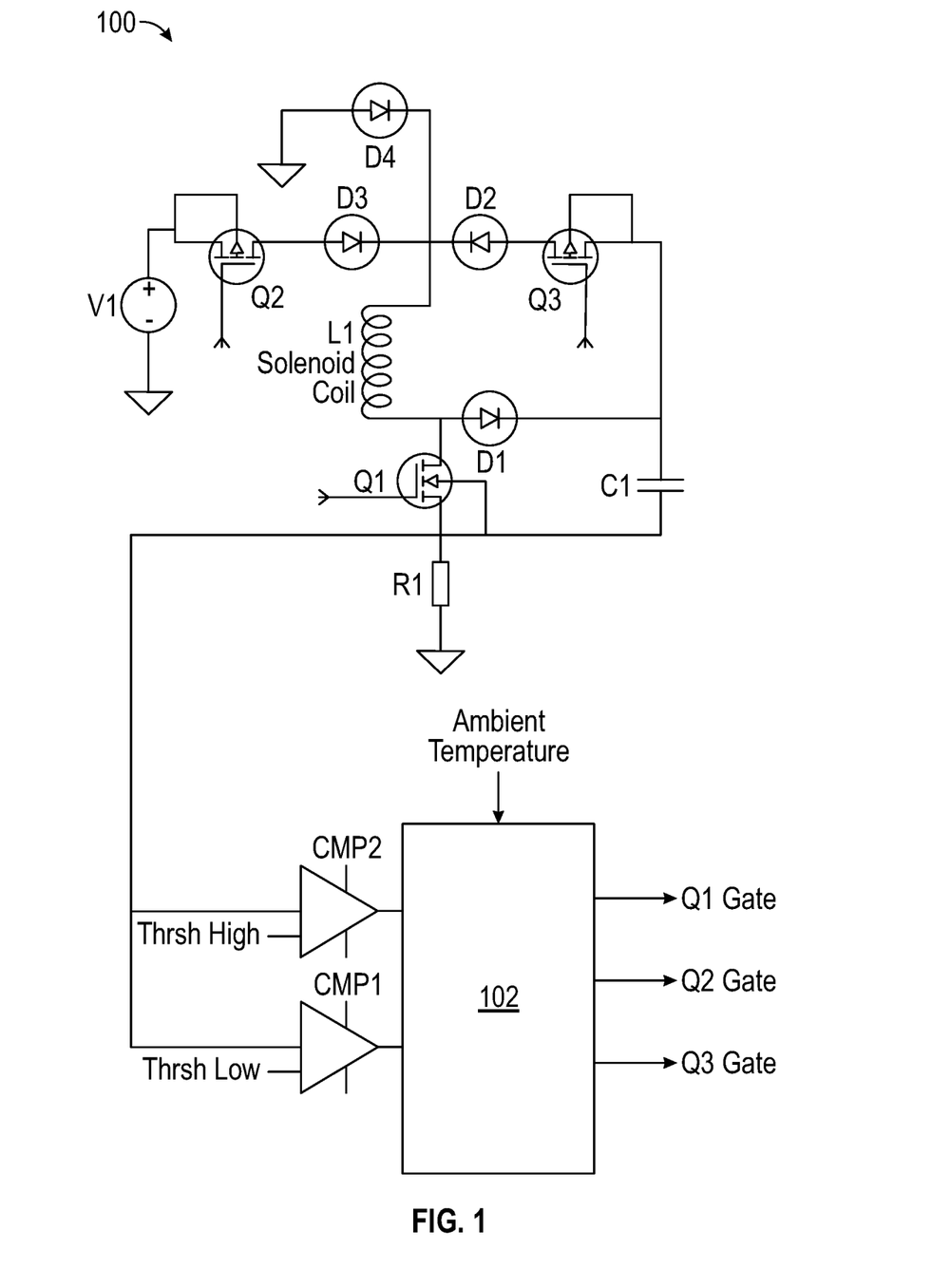
FIG. 1 is a schematic illustrating one of many embodiments of a solenoid control circuit according to the disclosure.
Figure 1A:
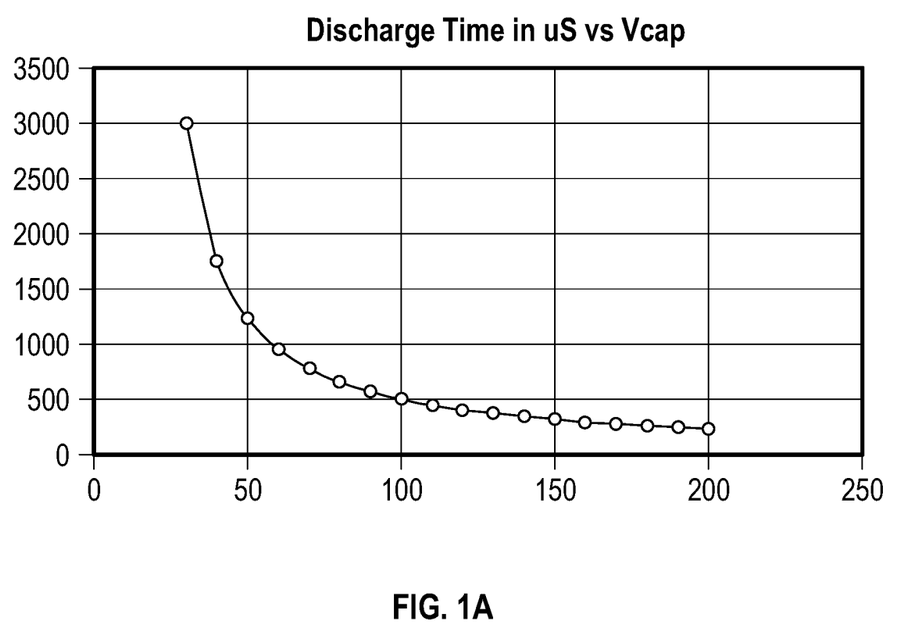
FIG. 1A is a plot illustrating capacitor discharge time versus capacitor voltage according to one of many embodiments of a solenoid control circuit according to the disclosure.
Figure 2:
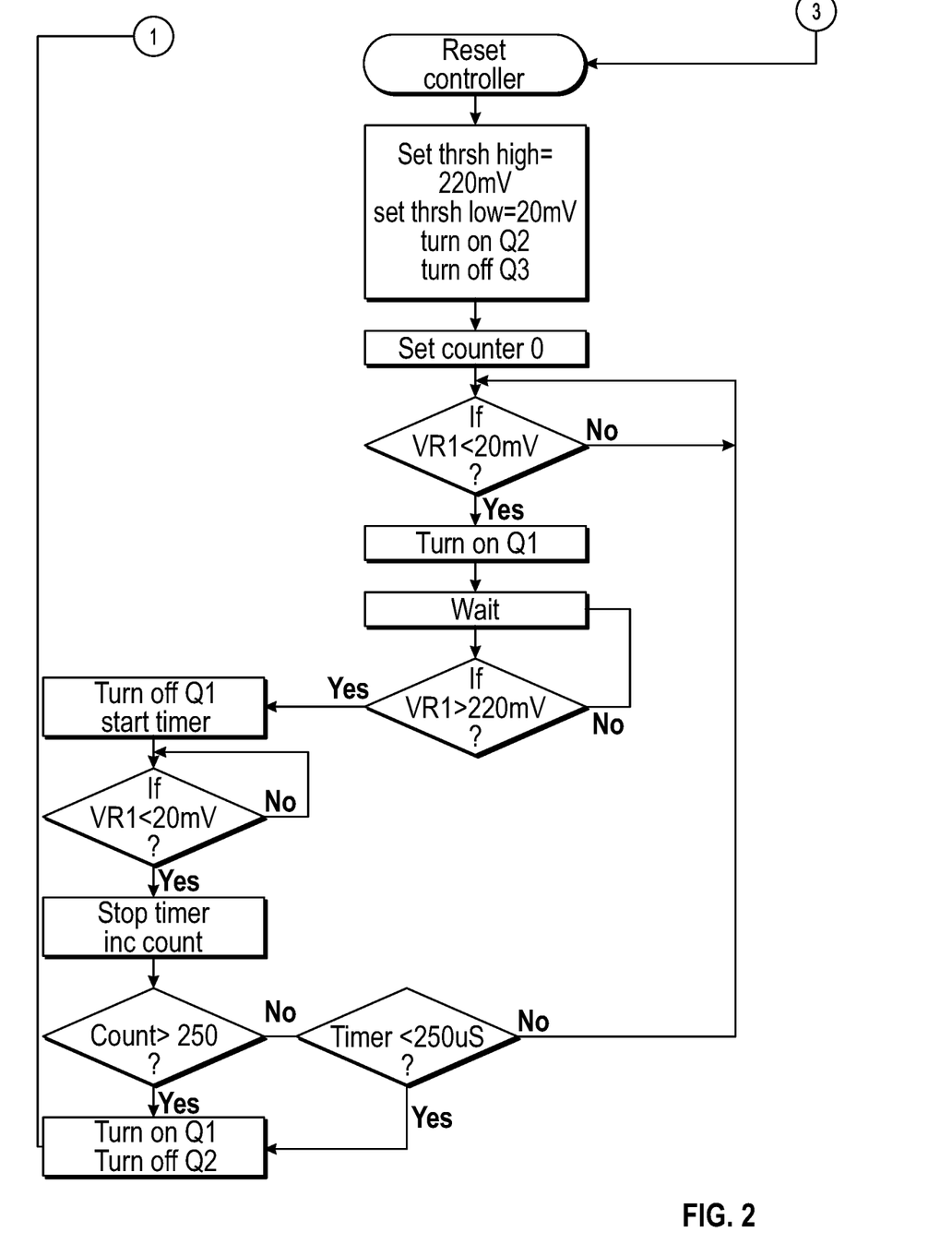
FIG. 2 is a flow chart illustrating one of many embodiments of a method for controlling a solenoid according to the disclosure.
Figure 3:
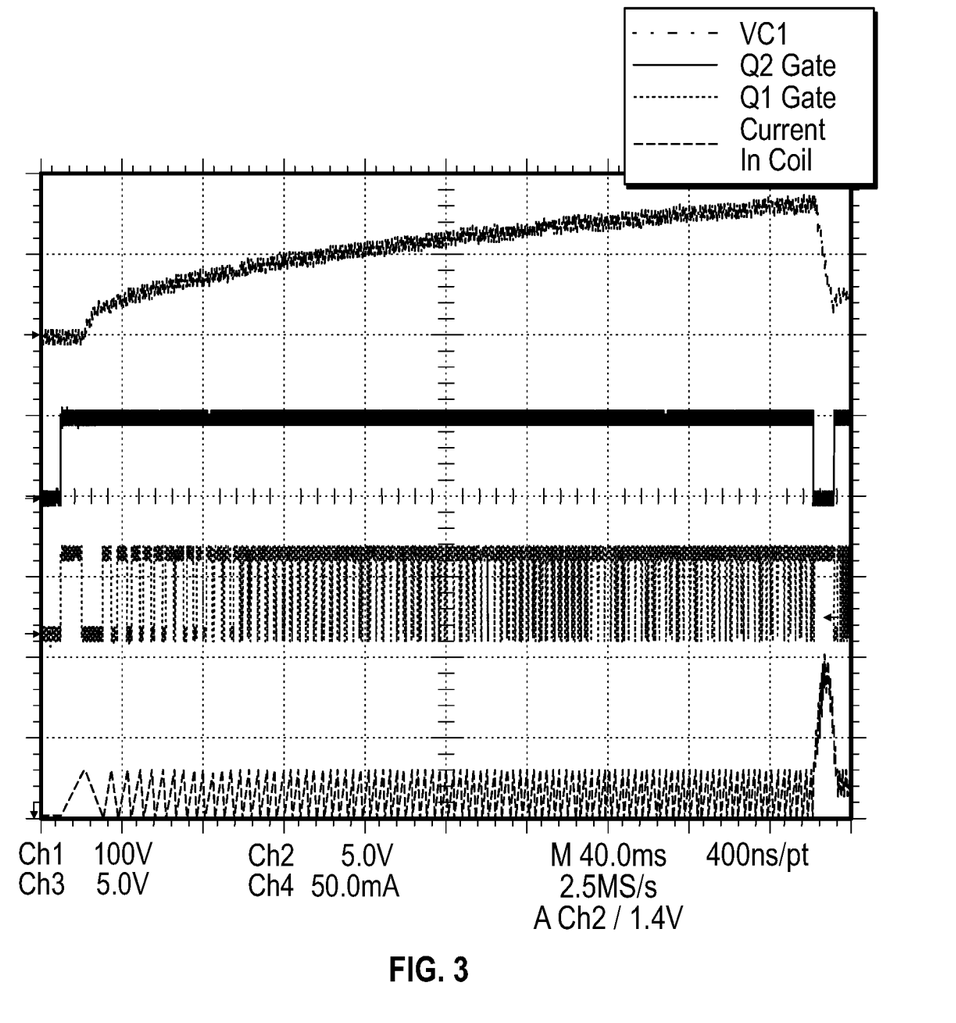
FIG. 3 is a set of waveforms illustrating aspects of one of many embodiments of a charging mode of a solenoid control circuit according to the disclosure.
Figure 4:
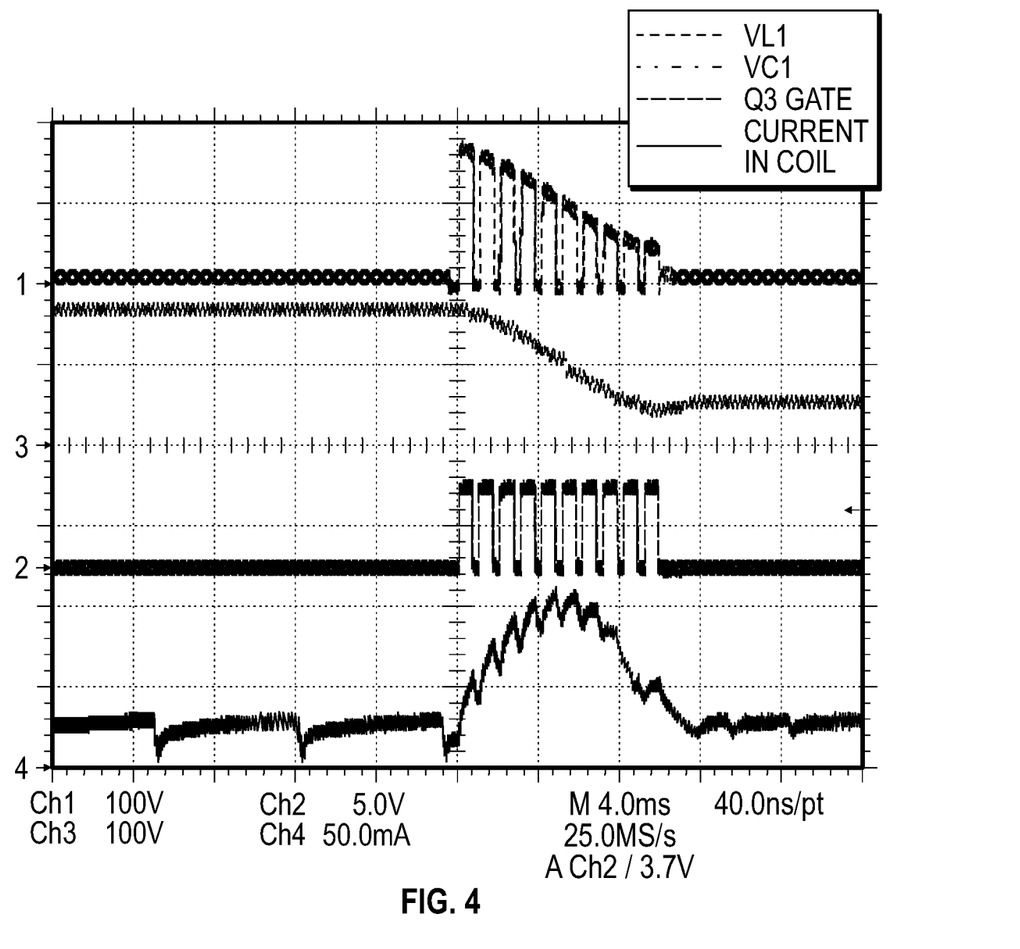
FIG. 4 is a set of waveforms illustrating aspects of one of many embodiments of a pull-in mode of a solenoid control circuit according to the disclosure.
Figure 4A:
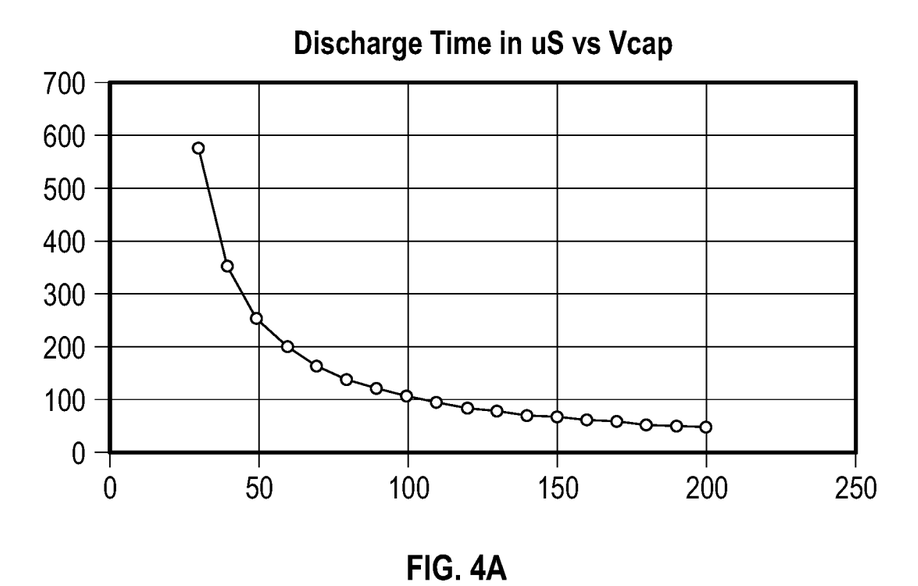
FIG. 4A is a plot illustrating capacitor discharge time versus capacitor voltage according to one of many embodiments of a solenoid control circuit according to the disclosure.
Figure 4B:
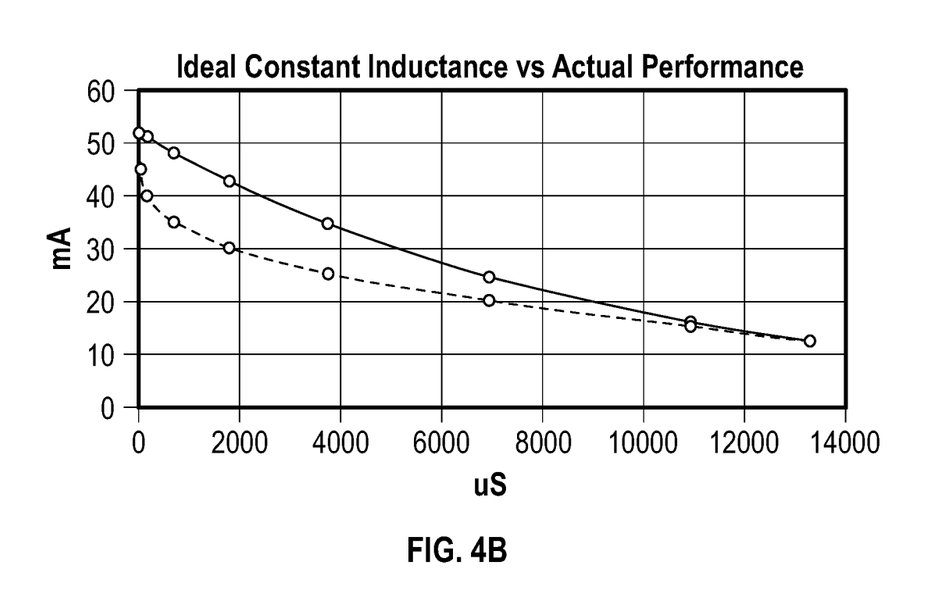
FIG. 4B is a plot illustrating ideal constant inductance versus actual inductance according to one of many embodiments of a solenoid control circuit according to the disclosure.
Figure 5:
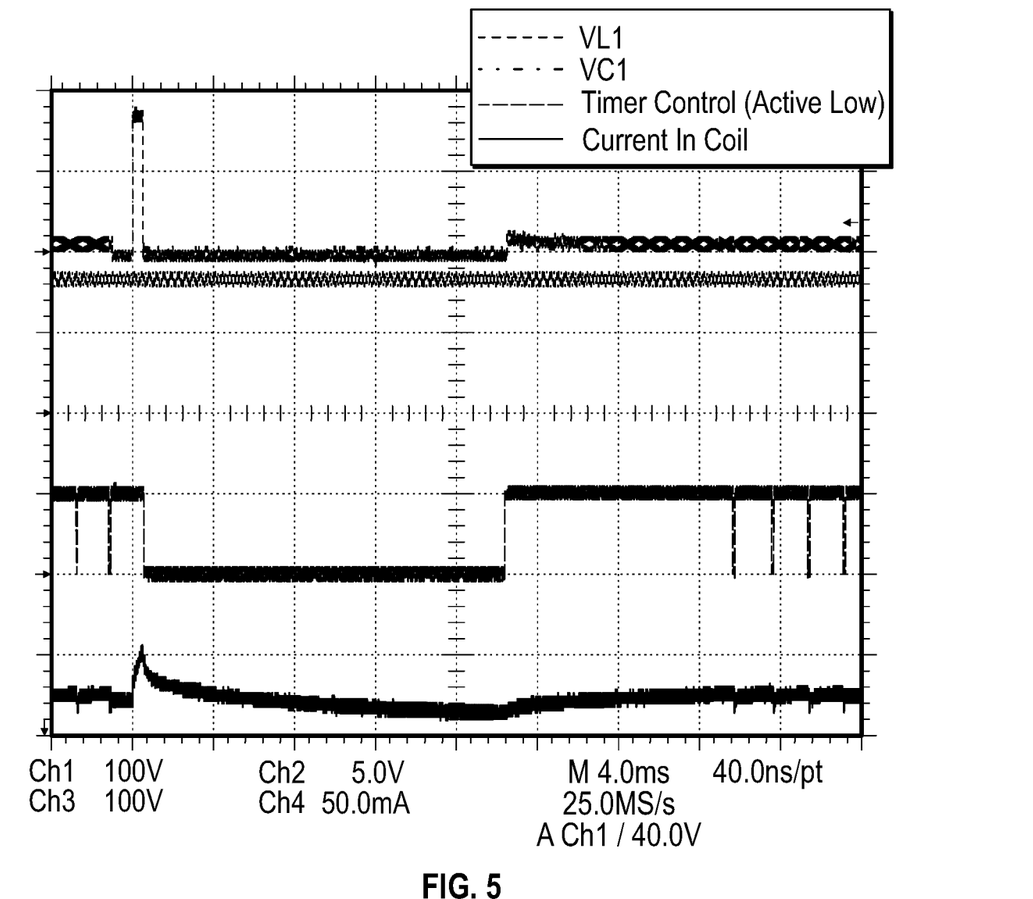
FIG. 5 is a set of waveforms illustrating aspects of one of many embodiments of a hold-detect mode of a solenoid control circuit according to the disclosure.
Figure 6:
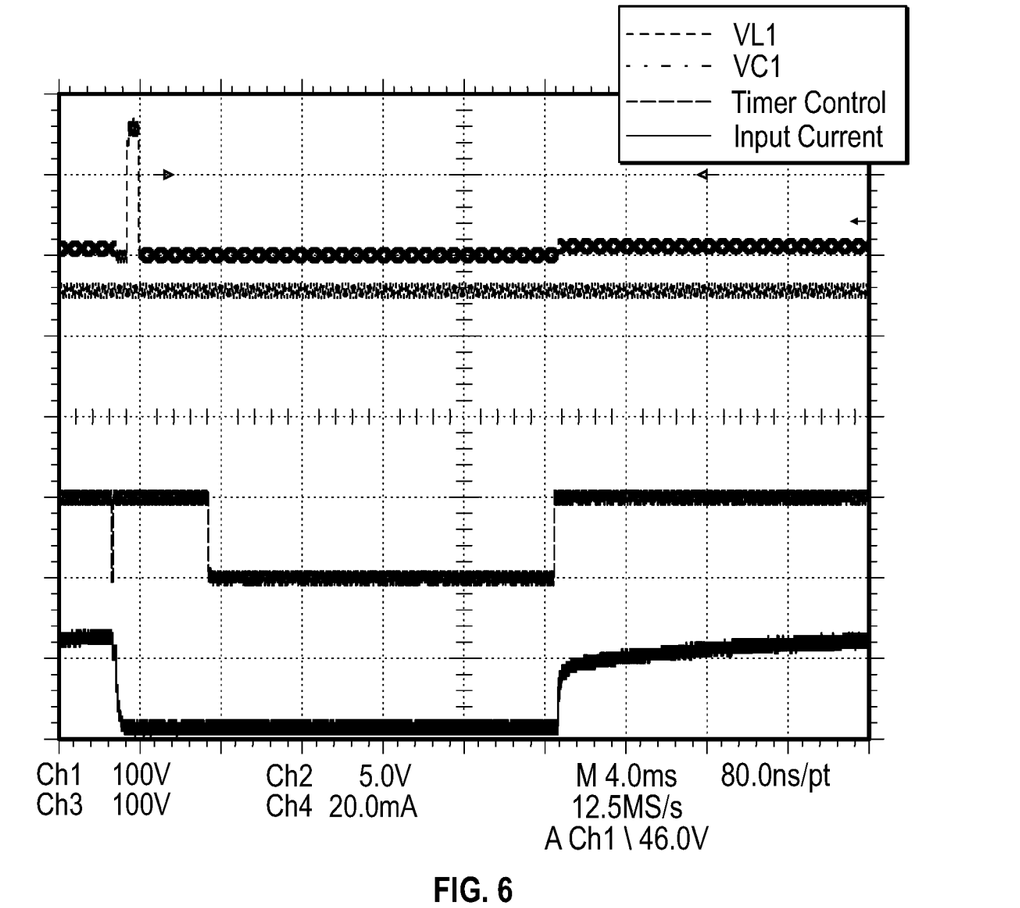
FIG. 6 is another set of waveforms illustrating aspects of one of many embodiments of a hold-detect mode of a solenoid control circuit according to the disclosure.

FIG. 1 is a schematic illustrating one of many embodiments of a solenoid control circuit according to the disclosure. FIG. 1A is a plot illustrating capacitor discharge time versus capacitor voltage according to one of many embodiments of a solenoid control circuit according to the disclosure. FIG. 2 is a flow chart illustrating one of many embodiments of a method for controlling a solenoid according to the disclosure. FIG. 3 is a set of waveforms illustrating aspects of one of many embodiments of a charging mode of a solenoid control circuit according to the disclosure. FIG. 4 is a set of waveforms illustrating aspects of one of many embodiments of a pull-in mode of a solenoid control circuit according to the disclosure. FIG. 4A is a plot illustrating capacitor discharge time versus capacitor voltage according to one of many embodiments of a solenoid control circuit according to the disclosure. FIG. 4B is a plot illustrating ideal constant inductance versus actual inductance according to one of many embodiments of a solenoid control circuit according to the disclosure. FIG. 5 is a set of waveforms illustrating aspects of one of many embodiments of a hold-detect mode of a solenoid control circuit according to the disclosure. FIG. 6 is another set of waveforms illustrating aspects of one of many embodiments of a hold-detect mode of a solenoid control circuit according to the disclosure. FIGS. 1-6 will be described in conjunction with one another.

In at least one embodiment, a solenoid control circuit 100 according to the disclosure can include a power source V1, such as a source of direct current (DC) power, an input switch Q2, one or more blocking diodes D1, D2, D3, D4, a low side switch Q1, a discharge switch Q3, a solenoid L1, an energy storage capacitor C1, and one or more resistors R1, such as a current sense resistor. Circuit 100 can include one or more controllers 102 for controlling one or more other components of the circuit, such as one or more of switches Q1-Q3. Controller 102 can receive input from one or more other components of the circuit, which can include one or more comparators CMP1, CMP2, such as analog or other comparators. In at least one embodiment, comparators CMP1 and CMP2 can be arranged for measuring the voltage drop across resistor R1 and comparing that voltage drop (VR1) to one or more threshold values, which can include one or more high or maximum values and/or one or more low or minimum values, separately or in combination, in whole or in part. Circuit 100 can be wholly or partially incorporated into a solenoid valve or component thereof, such as a solenoid valve for use in connection with pneumatic and/or hydraulic industrial control systems. In at least one embodiment, circuit 100 can include or otherwise be arranged to operate in a plurality of different modes. Such modes can include, but are not limited to, a charging mode for charging capacitor C1, a pull-in mode for actuating or pulling in solenoid L1, a hold-detect mode for holding solenoid L1 in an actuated position and detecting whether drop-out has occurred, portions of the forgoing modes, and/or one or more other modes, separately or in combination, in whole or in part. One or more of the aforementioned modes will now be described in further detail.

In the charging mode, solenoid L1 can be operated at an energy level below the level sufficient to pull-in the device, which can be any level according to an implementation of circuit 100. Switch Q2 can be placed in the on state (i.e., closed), which can electrically couple power source V1 to solenoid L1. The voltage VR1 across resistor R1 can be 0 volts at initialization and switch Q1 can be energized, for example, when VR1 is below a lower threshold value (THRSH LOW) or limit below which comparator CMP1 signals controller 102 to close switch Q1 for allowing current to build through solenoid L1 and resistor R1. When VR1 reaches a higher threshold value (THRSH HIGH), such as an upward threshold value or limit above which comparator CMP2 signals controller 102 to open switch Q1, switch Q1 can be turned off. When switch Q1 is turned off, the current in solenoid L1 can flow through capacitor C1 adding charge to it, and then can continue to flow through resistor R1, which can produce a potential drop, or voltage drop, VR1 across resistor R1. As the current decreases and the energy stored in the magnetic field of solenoid L1 is dissipated (i.e., discharge cycle), the value of VR1 can decrease. Upon VR1 reaching a value less than THRSH LOW, comparator CMP1 can once again close switch Q1 and the charging cycle can be reinitiated.

In at least one embodiment, during the above-mentioned discharge cycle, the time interval between comparator CMP2 switching off and comparator CMP1 switching on can be measured. Such a time interval is related to the value of the inductance and the resistance of the coil of solenoid L1, as well as to the amount of charge stored in capacitor C1. More specifically, voltage source V1 can be connected to inductor L1, such as to the top (with reference to the example of FIG. 1) via switch Q2 and diode D3. The bottom of inductor L1 (with switch Q1 off) can be connected through diode D1 to the top of storage capacitor C1. The bottom of capacitor C1 can be connected to sense resistor R1. When comparator CMP2 turns off (turning off Q1), there can be a current flowing in inductor L1 (such as, for example, approximately 22 mA peak current (Ip)). That current will want to continue to flow due to the collapsing magnetic field of inductor L1 and can flow into capacitor C1 for charging it. This process can continue until the lower trip point of comparator CMP1, which can be Imin (e.g., 2 mA in this example, which is but one of many). The solenoid coil of inductor L1 can have internal resistance in addition to its inductance which forms a natural time constant (L/Rcoil) of inductor L1, which can vary from inductor to inductor. The time to discharge the inductor current can be determined according to the following equation (Equation 1):

$$t = -\frac{L}{Rcoil} * \ln((Vcap - V1 + Vdiode + Rcoil * I\min)/(Vcap - V1 + Vdiode + Rcoil * Ip))$$

In Equation 1, t is the discharge time, L is inductance, Rcoil is the resistance of the coil of inductor L1, Vcap is the voltage across capacitor C1, V1 is the source voltage, Vdiode is the voltage across diode D1, Imin is the lower trip point of comparator CMP1 and Ip is the peak current flowing in inductor L1. An exemplary plot of discharge time t versus voltage across capacitor C1 Vcap is shown in FIG. 1A for illustrative purposes. In embodiment concerned with terminating the process of charging C1 at voltages of 180 to 200 volts, for example, the effect of change in V1 (which can typically be 15 to 30 volts, for example) generally will not have much effect on the measurement. In addition, the temperature compensation of Rcoil can lead to repeatable energy storage in C1 by measuring this discharge time. These parameters can be measured and can be repeatable over production tolerances for a solenoid used in a commercial or other physical embodiment of the present disclosure.

Accordingly, the level or amount of energy available in capacitor C1 can be ascertained by measuring this time interval. In at least one embodiment, such a time interval can be compared with a value obtained through measurement (e.g., approximately 250 microseconds (uS)) for a particular capacitor utilized in connection with an implementation of circuit 100 (which can be any capacitor) and which corresponds to an amount of charge time needed to achieve a level of charge, such as a full charge or other charge, which can be or include a charge sufficient to pull in a solenoid of circuit 100. In this manner, it can be determined when the charging cycle has charged capacitor C1 sufficiently to pull in solenoid L1 and the charging process can optionally be terminated until a later time or otherwise. At this point, capacitor C1 can have been charged to a target voltage, such as, for example, approximately 200 VDC or another voltage according to a particular implementation of the disclosure, which can be any voltage. Exemplary waveforms associated with the charging mode steps described above are shown in FIG. 3 for illustrative purposes; the waveforms correspond to but one of many examples of a physical implementation of the present disclosure and can change from implementation to implementation depending on the components and configuration(s) utilized. More specifically, FIG. 3, waveform VC1 illustrates the voltage VC1 across an exemplary capacitor C1 as it is being charged via the cycling of switch Q1 on and off based on measured current flow through inductor L1 via sense resistor R1. The value of VC1 can increase in steps every time switch Q1 is turned off. The energy delivered for each step can be determined according to the following equation (Equation 2):

$$E = \frac{1}{2}L1Ip^2$$

In Equation 2, E is the energy delivered to capacitor C1 during each on-off cycle of switch Q1, L1 is the inductance of inductor L1 and Ip is the peak current flowing in inductor L1. Switch Q2 can be turned on during charging to provide connection to power source V1. The state of switch Q1 can be controlled by controller 102 in response to comparators CMP1, CMP2 arranged for measuring voltage drop VR1 across resistor R1. As illustrated by the Q1 GATE waveform of FIG. 3 and discussed above, capacitor voltage VC1 can increase as switch Q1 off time decreases. As shown in the CURRENT IN COIL waveform of FIG. 3, during the charging phase, the resulting current in inductor L1 can ramp up or gradually increase between two current values that represent the appropriate current thresholds for inductor L1, which can be any thresholds according to an implementation of the disclosure. At the end of the charging cycle, capacitor C1 can discharge, in which case voltage VC1 can decrease (see waveform VC1) as capacitor C1 discharges and the current in inductor L1 can accordingly rise sharply to pull in the solenoid, as further discussed below and illustrated in the CURRENT IN COIL waveform of FIG. 3. In at least one embodiment, switch Q2 can be disconnected from power source V1 at this point, as illustrated in waveform Q2 GATE of FIG. 3.

In at least one embodiment, in charging mode, THRSH LOW can be 20 millivolts (mV) and THRSH HIGH can be 220 mV. However, this need not be the case, as these values are examples according to one of many implementations of circuit 100 and are discussed herein for purposes of illustration and not limitation. THRSH LOW and THRSH HIGH in charging mode can have any value or values according to an implementation of the disclosure and can (and likely will) vary among implementations. THRSH HIGH and THRSH LOW comparator threshold settings are typically based on the required coil current for a solenoid to be used in a physical implementation of the disclosure, which can be any solenoid suitable for such implementation. The thresholds coordinate with the resistance of a corresponding sense resistor R1, which can likewise change from implementation to implementation. Coil current operating limits can effectively be based on an applicable threshold voltage value divided by the resistance value of R1. In the exemplary implementation discussed herein, which is but one of many, the high and low threshold values during this phase are 220 mV and 20 mV, respectively, and the value for R1 is 10 ohms, which yields 22 mA and 2 mA, respectively. In other implementations of the present disclosure involving alternate solenoid constructions, the above-mentioned values can change and/or be adjusted for effecting operation of circuit 100 as described herein.

Turning now to the pull-in mode, in at least one embodiment, solenoid L1 can be disconnected from power source V1 by turning off or opening switch Q2. Switch Q1 can be turned on, and Q3 can be manipulated for controlling one or more rates or other attributes of circuit 100. For example, in at least one embodiment, switch Q3 can be driven in a pulse width modulation (PWM) mode for a number of pulses for discharging the energy stored in capacitor C1 in a fashion that controls the turn-on current waveform of rate of rise of solenoid L1 and adjusts the solenoid performance as it is pulling in. In at least one embodiment, Q3 can be driven for one or more pulses, which can include a fixed or variable number of pulses according to an implementation of the disclosure, which can be any number of pulses (as further discussed below). During this time, the solenoid can be pulled in. Following the end of the PWM period, switches Q1 and Q3 can be turned off and any residual stored energy in inductor L1 can be returned to capacitor C1.

Exemplary waveforms associated with the pull-in mode steps described above are shown in FIG. 4 for illustrative purposes. In at least one embodiment, for example, in the pull-in mode, Q3 can be driven in PWM mode at 70% duty cycle and a 1 mS period. However, this need not be the case, as these values are examples according to one of many implementations of circuit 100 and are discussed herein for purposes of illustration and not limitation. The PWM variables can have any value or values according to an implementation of the disclosure and can (and likely will) vary among implementations. In at least one embodiment, the purpose of the PWM pull in phase is to adjust the solenoid current during pull in such that the duration and amplitude of the current will optimally pull in the solenoid using a minimum amount of current. The number of pulses and the duty cycle can adjust the duration of the pull in as well as amplitude based on applicable parameters, which can include electrical parameters (i.e., inductance and resistance) and mechanical parameters (i.e., moving mass, spring force and friction). By observation of a solenoid current waveform during development of a physical implementation or otherwise, these parameters can be varied and the shape of the waveform observed. If the duty cycle is too high the solenoid may discharge the capacitor too quickly and not allow current to build high enough of for a sufficient amount of time thus preventing the armature of a solenoid from moving enough. Similarly, if the duty cycle is too low the solenoid current will not achieve a suitable pull in value. A change in shape can be observed in a current waveform when a solenoid armature moves and comes to rest (which is characterized by an inflection point in the solenoid current); the duration of pulses can be configured for ensuring that such movement has taken place. The duty cycle of the PWM can also vary the rate of extraction of energy from the capacitor, which can include allowing or controlling withdrawal or dissipation of the energy at a pace consistent with the mechanical response of the device. In at least one embodiment, the duty cycle can vary at one or more points of the pull in phase for shaping the current waveform in a more optimal fashion according to a particular physical implementation at hand.

Turning now to the hold-detect mode, in at least one embodiment, this mode of operation of circuit 100 can include a plurality of phases. In a first phase, which can be an initial phase, for example, switch Q2 can be turned on and switch Q3 can be turned off. THRSH LOW can be set to a different value (e.g., 140 mV) and Q1 can be controlled by switching signals from comparators CMP1 and CMP2. VR1 can cycle between THRSH LOW and THRSH HIGH (e.g., 140 mV and 220 mV in the exemplary case discussed herein, which is but one of many possibilities). Increasing the value of THRSH LOW during the present mode relative to the value of THRSH LOW used during the charging mode discussed above can at least partially ensure that the current in the coil of solenoid L1 does not drop below the holding current $I_H$ of solenoid L1. As in the original charging mode, the current discharge time interval can be measured and compared against an experimentally observed value (e.g., 55 uS in the example case), which can be different from the value utilized during the charging mode, for example, because the inductance value of the coil of solenoid L1 has changed due to the solenoid moving from open to closed.

During the hold-detect mode, the capacitor voltage VC1 can be replenished, which can be carried out in a manner similar to that of the initial charging mode described above. However, the minimum current Imin can be higher (e.g., 14 mA in the example discussed herein) for preventing the armature of the solenoid from disengaging from the corresponding fixed pole piece. Per Equation 1 discussed above, because the minimum current Imin is now higher it takes less time to discharge capacitor C1 so a shorter time t is appropriate. An exemplary plot of discharge time t versus voltage across capacitor C1 Vcap is shown in FIG. 4A for illustrative purposes. When the target current discharge time interval has been reached, a second phase of the hold-detect mode can commence.

In the second phase, switch Q2 can be turned off, switch Q1 can be turned on and switch Q3 can be pulsed for discharging energy from capacitor C1 (e.g., once for 500 uS in the running example discussed herein, but other scenarios are possible). This short pulse or other pulsing of switch Q3 can discharge a small amount of energy from capacitor C1 and cause an increase in current in solenoid L1. Because the energy extracted from capacitor C1 at this point is small, there is only a small voltage drop created and sufficient energy remains available in capacitor C1 for re-energizing solenoid L1 quickly if it were to drop out. At the end of the pulse, with switch Q3 off, current can be discharged through solenoid L1, diode D4, switch Q1 and resistor R1, which can follow the exponential curve with a time constant based on the inductance and resistance of solenoid L1. In other words, if a solenoid coil's inductance is treated a constant value, the equation for measuring the position of the armature can be based on the following equation (Equation 3):

$$t = -\frac{L}{Rcoil} * \ln\left(\left(\frac{Imin}{Ip}\right) - \ln\left(\frac{Imax}{Ip}\right)\right)$$

In Equation 3, the variables correspond to those described above with regard to Equations 1 and 2. The inductance of a solenoid divided by the resistance of the coil is the definition of the inductive time constant, as illustrated by the solid line in FIG. 4B. However, when dealing with an actual solenoid made from ferromagnetic steel parts, the time response of the current can be affected by other factors, including nonlinearity due to the BH curve (aka magnetization curve) of the ferromagnetic material and eddy current effects generated by the rate of change of flux linkages in the ferromagnetic material as the solenoid is switched on and off. These can cause a time response curve not to follow the relatively simplified Equation 3 above which is a classic solution to the first order differential equation being an exponential decay curve. An analysis of the foregoing can be carried out, for example, with use of finite element analysis (FEA) software having a transient solver. The actual values determined by testing in the illustrative example discussed throughout this disclosure are as follows and are illustrated by the dashed line of FIG. 4B. In this case, which is but one of many possible implementations of the present disclosure, when switch Q3 is pulsed for 500 uS the current in the solenoid rises to a value of 51 mA. At the end of the 500 uS pulse, Q3 is turned off and the current in L1 starts to decay from the Ip (51 mA). When the value drops below Imax (22 mA), comparator CMP2's change in state will initiate controller 102 to start the timing cycle and continue until comparator CMP1 changes state at Imin (14 mA) thus terminating the timing cycle. Boosting of the current through the capacitive discharge of 500 uS and then measuring the timing at the lower current level is advantageous to making this measurement. Since the discharge equation is of an exponential form, measuring in the latter part of the curve yields more resolution in measurement since the rate of change of current is less, thus making the measurement value larger. For example, if in the same exemplary circuit the pulse of switch Q3 is reduced from 500 uS to 50 uS, the current in inductor L1 will not have time to rise above Imax (22 mA); under those conditions in the solenoid tested, the measured time for discharge in the minimum air gap position is 10 mS and the same measurement in the maximum air gap position is 6.5 mS, a difference of 3.5 mS. However, with the 500 uS pulse and the 51 mA Ip, the minimum air gap position changes to 15.1 mS time for discharge and the maximum air gap position changes to 9 mS time for discharge, a difference of 6.1 mS which is almost double the previous. In addition, the observed measurement can be more repeatable and stable in the latter configuration than an in the former configuration.

The voltage VR1 developed across resistor R1 can be detected by comparators CMP1 and CMP2. As VR1 decays, it can first trigger comparator CMP2 THRSH HIGH (e.g., 220 mV), at which point a time counter can be started. As VR1 continues to decay, it can then or later trigger comparator CMP1 THRSH LOW (e.g., 140 mV), at which point the counter can be stopped. An accumulated time value stored in or otherwise associated with the counter can be proportional to the inductance of solenoid L1. Further, the inductance of solenoid L1 can be related to the relative position of a fixed pole piece and a moveable pole piece of the solenoid; that is, the stroke of the solenoid will change the working airgap in the magnetic circuit of the solenoid. This will change the magnetic reluctance of the path, which will increase with a larger airgap (also, the flux linkages will decrease with an increasing air gap). The current decay waveform can be experimentally observed for the two positions (i.e., a closed position and an open position, which correspond to a larger air gap in the solenoid and a smaller air gap in the solenoid, respectively) and two values of measured time can be determined. As discussed above for the present example, the values were 9 mS for the larger air gap and 15.1 mS for the smaller air gap; hence, a value of, for example, 11 mS can be chosen as a threshold value and can have sufficient margin for detecting the larger air gap of the solenoid in a dropped-out condition. In this manner, it can be seen that the contents or accumulated time value of the counter can be compared to a threshold value that represents the condition of a solenoid in a dropped-out condition, which can be any solenoid utilized in an implementation of circuit 100 according to the present disclosure.

In at least one embodiment, the resistance of solenoid L1 can affect the time value stored in or obtained via the counter and circuit 100 can include circuitry for compensating for this effect based on the ambient temperature of the coil (or winding) of solenoid L1. This compensation can be accomplished by analog or digital means, separately or in combination, in whole or in part. For instance, an analog means can include a temperature compensating network disposed in series with solenoid L1 and configured for cancelling the mentioned resistance variation. As another example, a digital means can include an ambient temperature sensor readably coupled to controller 102 and the value in the counter or the threshold can be adjusted to compensate for resistance change.

If a condition of drop-out of solenoid L1 is detected, circuit 100 can reinitiate the charging and pull-in modes to return the solenoid to its proper state. In at least one embodiment, because there can be a stored charge still available in capacitor C1 when circuit 100 reenters the charging mode, the time interval of the controller 100 (which can be a hysteretic controller) off time can be very close to the limit. Consequently, a limited number of charging cycles may need to occur before the solenoid is re-energized. Exemplary waveforms associated with the hold-detect mode steps described above are shown in FIG. 5 for illustrative purposes. More specifically, if a drop-out condition is detected in the hold-detect mode, then logic in controller 102 can reenter the charge and pull-in mode provided the solenoid needs to be pulled in. The number of requisite charging pulses can be dependent on the value of the stored charge in capacitor C1. As discussed elsewhere in this disclosure, by measuring the off time of the pulsing that occurs during the charging phase, the state of the capacitor's charge can be determined. If the value of the charge stored in the capacitor at the time of drop-out detection is close to the amount required to pull in the solenoid, then the number of charge cycles needed will be relatively small as compared conditions such as if a system was re-energized after being de-energized for a period of time that allowed the capacitor charge to dissipate to zero or another value lower than the charge needed to pull in the solenoid. In this manner, it can be seen that the systems and methods of the present disclosure allow for rapid re-energization of a solenoid under conditions of dropout or, as another example, when a system is de-energized for a brief time (e.g., 5 seconds or less) and a solenoid is called on to operate again quickly following re-energization.

In at least one embodiment of the present disclosure, circuit 100 can be configured for monitoring or observing the waveform of the current being drawn during operation to detect or determine one or more characteristics of the system or a component thereof. For example, circuit 100 can supply power to solenoid L1 and can be configured to determine diagnostic information about the solenoid by monitoring the current being supplied during operation. In at least one embodiment, circuit 100 can be configured so that current is only drawn from the power source V1 when switch Q2 is turned on. Further, in the context of the various modes described in more detail above, circuit 100 can be configured so switch Q2 is turned on only during one or more of the main charging modes and the charging phase that occurs during the hold-detect mode. The duration of these charging pulses can be proportional to the voltage seen at the input to solenoid L1, and furthermore the spacing between the occurrences of charging pulses during which no current is being drawn (i.e., solenoid L1 is utilizing internally stored energy) can be related to the inductance of solenoid L1. Circuit 100 can be configured to utilize the charging pulse duration and interim spacing for detecting or otherwise determining information about the position of solenoid L1, as illustrated, for example, in FIG. 6. FIG. 6 is similar to FIG. 5 described above, although an exemplary INPUT CURRENT waveform showing current drawn from source V1 is shown in place of the coil current. As demonstrated in FIG. 6, the input current goes to zero during the detect phase of the hold-detect mode. Further, as discussed above, the length of the detect phase can change based on the state of a solenoid stroke. In at least one embodiment, for example, controller 102 can be configured to monitor current being drawn from source V1 and make a determination regarding the position of a solenoid based on the duration of the zero current period.

As will be understood by a person of ordinary skill in the art having the benefits of the present disclosure, the circuitry systems and corresponding methods disclosed herein have the advantage of simple circuitry and non-critical measurement techniques. Embodiments utilizing a relatively high current pulse followed by a lower detection threshold current can be configured such that one or more measurements take place along a relatively flatter portion of the exponential curve, which can produce larger time changes that provide for the detection of differences in the position of the magnetic components of the solenoid without the need for as much critical circuitry as can be required by some conventional methods. If the current in the solenoid coil drops too low the solenoid will dropout so there are limits to how low the current can go in this regard. However, creating a current pulse with a capacitor in the manner described herein can allow the detection threshold to be large enough to keep the magnetic components of the solenoid together while simultaneously providing a basis for good detection.

As will be also understood by a person of ordinary skill in the art having the benefits of the present disclosure, one or more of the methods of detection disclosed herein can involve the inductance of the solenoid and can further include ascertaining the condition of the solenoid while also being relatively insensitive to variations in operating voltage. The systems and methods of the present disclosure can be especially useful, for example, in applications that call for intrinsically safe devices or applications that are inherently or otherwise energy limited. In addition, the systems and methods of the present disclosure, which can include controller 102 or other system components or circuitry described herein, can be configured for communicating one or more states of a solenoid to another control system or another type of system, including by way of wired of wireless interfaces, separately or in combination, in whole or in part.

In at least one embodiment, an additional feature of the systems and methods of the present disclosure can include the ability of the circuit to provide a rapid re-energization of the solenoid after de-energization. There are applications for example in the process industry where the health of a large pneumatically actuated valve, such as a valve that is normally energized for extended periods of time, is tested by de-energizing the pilot control valve, checking with a valve indicating device if the valve has shifted, and then after a very short period (e.g., less than 100 mS) re-energizing the pilot control valve. This process may take place to verify that the valve can move, i.e., that the valve has not locked into the open mode and is cable of closing. This testing protocol may not be an issue with normal power pilot valves but can be an issue with low power pilot valves that use energy storage devices to provide assisted opening power. The amount of time required to charge the energy storage device in at least some cases can be greater than 750 mS, which may prevent the rapid re-energization of the valve and preclude the use of such valves with the above-mentioned testing protocol. In at least one embodiment, the systems and methods of the present disclosure can allow an energy storage device to be maintained in a state of full charge after initial energization, which means that if the valve is subsequently de-energized as described in the above testing protocol, there can already be sufficient energy available in the storage device to rapidly re-energize the valve within the 100 mS requirement, for instance.

Other and further embodiments utilizing one or more aspects of the systems and methods described above can be devised without departing from the spirit of Applicant's disclosures. For example, the systems and methods disclosed herein can be used alone or to form one or more parts of other valves, valve components and/or fluid control systems. Further, the various methods and embodiments of the control systems can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicant's disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicant's disclosures, but rather, in conformity with the patent laws, Applicant intends to fully protect all such modifications and improvements that come within the scope or range of equivalents of the claims.

What is claimed is:

1. A method comprising the steps of:
   (a) closing an input switch, thereby energizing a low side switch and allowing a source current to flow through an inductor and a resistor;
   (b) opening the low side switch upon a voltage drop across the resistor reaching a first threshold, thereby forcing a charge current to flow through an energy storage device utilizing the inductance of the inductor;
   (c) closing the low side switch upon the voltage drop across the resistor reaching a second threshold, wherein the second threshold is lower than the first threshold;
   (d) repeating steps a, b and c until the energy storage device is charged;
   (e) closing a discharge switch, thereby forcing a discharge current to flow from the energy storage device to the inductor causing the inductor to produce an actuating magnetic field thereby actuating a valve.

2. The method of claim 1, wherein the source current is insufficient to actuate the valve.

3. The method of claim 1, further comprising measuring the voltage drop across the resistor with first and second comparators.

4. The method of claim 3, further comprising measuring a time interval between the second comparator switching off and the first comparator switching on.

5. The method of claim 4, further comprising opening the input switch upon the time interval reaching a cutoff value.

6. The method of claim 4, further comprising measuring a plurality of time intervals over a corresponding series of occurrences of the second comparator switching off and the first comparator switching on.

7. The method of claim 6, further comprising opening the input switch upon a sum of the plurality of time intervals reaching a cutoff value.

8. The method of claim 7, wherein the cutoff value corresponds to a charge time of the energy storage device.

9. The method of claim 1, further comprising:
   (f) opening the input switch;
   (g) closing the low side switch; and
   (h) driving the discharge switch in a pulse width modulation (PWM) mode for a plurality of pulses thereby controlling the discharge current rate and the inductor's production of the actuating magnetic field.

10. The method of claim 9, further comprising opening the low side switch and the discharge switch.

11. The method of claim 10, further comprising returning residual energy from the inductor to the energy storage device.

12. The method of claim 10, further comprising closing the input switch and increasing the second threshold, the second threshold remaining lower than the first threshold.

13. The method of claim 12, further comprising:
   (i) measuring a current discharge time interval;
   (j) upon the time interval reaching a cutoff value, opening the input switch and pulsing the discharge switch thereby causing an increase in current in the inductor; and
   (k) opening the discharge switch.

14. The method of claim 12, further comprising measuring a time interval between actuation of the second comparator and actuation of the first comparator and determining a condition of the inductor by comparing the time interval to a threshold value.

15. The method of claim 12, wherein the threshold value represents a dropout condition of the inductor.

16. The method of claim 15, further comprising compensating for the resistance of the inductor by adjusting the threshold value based on an ambient temperature of a winding of the inductor.

17. The method of claim 12, further comprising maintaining the second threshold at a level sufficient to maintain a holding current of the inductor.

18. The method of claim 12, further comprising pulsing the discharge switch and maintaining a level of energy in the energy storage device sufficient to cause the inductor to produce an actuating magnetic field.

19. The method of claim 18, further comprising maintaining a level of energy in the energy storage device sufficient to cause the inductor to produce an actuating magnetic field within 100 milliseconds of a dropout condition of the inductor being detected.

20. The method of claim 9, further comprising driving the discharge switch in the PWM mode for a number of pulses adequate to maintain a level of energy in the energy storage device sufficient to cause the inductor to produce an actuating magnetic field upon a dropout condition of the inductor being detected.

21. The method of claim 20, further comprising closing the discharge switch for a time period adequate to allow measurement of inductance without reducing the level of energy in the energy storage device below the level sufficient to cause the inductor to produce an actuating magnetic field.

22. The method of claim 21, further comprising closing the discharge switch for 500 microseconds.

* * * * *